US011449867B2

(12) United States Patent
Guo

(10) Patent No.: US 11,449,867 B2
(45) Date of Patent: Sep. 20, 2022

(54) INFORMATION GENERATION, ACQUISITION, AND PROCESSING TO IMPROVE SERVICE EFFICIENCY

(71) Applicant: Advanced New Technologies Co., Ltd., Grand Cayman (KY)

(72) Inventor: Wei Guo, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/373,483

(22) Filed: Jul. 12, 2021

(65) Prior Publication Data

US 2021/0342843 A1    Nov. 4, 2021

Related U.S. Application Data

(63) Continuation of application No. 16/720,360, filed on Dec. 19, 2019, now Pat. No. 11,062,311, which is a
(Continued)

(30) Foreign Application Priority Data

Nov. 27, 2015   (CN) .......................... 201510849154.2

(51) Int. Cl.
*G06Q 20/40* (2012.01)
*G06K 19/06* (2006.01)
(Continued)

(52) U.S. Cl.
CPC ......... *G06Q 20/4014* (2013.01); *G06K 19/06* (2013.01); *G06Q 20/3276* (2013.01); *G06Q 30/06* (2013.01); *G06K 7/1417* (2013.01)

(58) Field of Classification Search
None
See application file for complete search history.

(56) References Cited

U.S. PATENT DOCUMENTS 7,904,360 B2    3/2011  Evans
10,223,664 B2*  3/2019  Gillen ................ G06Q 30/0635
(Continued)

FOREIGN PATENT DOCUMENTS

| CN | 101996369 | 3/2011 |
| CN | 103154986 | 6/2013 |

(Continued)

OTHER PUBLICATIONS

Saettler, Zapper boosts at the table mobile payments via QR codes, 2014, entire document pertinent, retrieved from https://web.archive.org/web/20140811181315/http://www.mobilecommercedaily.com/zapper-boosts-at-the-table-mobile-payments-via-qr-codes (Year: 2014).*

(Continued)

*Primary Examiner* — Gregory S Cunningham, II
(74) *Attorney, Agent, or Firm* — Fish & Richardson P.C.

(57) ABSTRACT

An instruction to generate target information is received by a server and from a first user. The instruction includes two or more pieces of user identity information associated with two or more different users. The two or more pieces of user identity information are combined, by the server and in a predetermined method, into continuous text information. The two or more pieces of user identity information in the continuous text information are separated by one or more separation strings. The target information is generated, by the server, based on at least a predetermined algorithm and the continuous text information.

17 Claims, 10 Drawing Sheets

Related U.S. Application Data continuation of application No. 15/986,939, filed on May 23, 2018, now Pat. No. 11,127,007, which is a continuation of application No. PCT/CN2016/106324, filed on Nov. 18, 2016.

(51) Int. Cl.
  *G06Q 30/06* (2012.01)
  *G06Q 20/32* (2012.01)
  *G06K 7/14* (2006.01)

(56) References Cited

U.S. PATENT DOCUMENTS

| | | | |
|---|---|---|---|
| 11,062,311 B2 | 7/2021 | Guo | |
| 2012/0084162 A1 | 4/2012 | Smith et al. | |
| 2012/0130889 A1 | 5/2012 | Lyons et al. | |
| 2014/0279483 A1* | 9/2014 | Bridges | G06Q 20/3276 705/42 |
| 2016/0012465 A1* | 1/2016 | Sharp | G06Q 20/321 705/14.17 |
| 2016/0063498 A1 | 3/2016 | Li | |
| 2018/0268409 A1 | 9/2018 | Guo | |
| 2020/0126084 A1 | 4/2020 | Guo | |

FOREIGN PATENT DOCUMENTS

| | | | |
|---|---|---|---|
| CN | 103607377 | 2/2014 | |
| CN | 103607377 A * | 2/2014 | |
| CN | 104077684 | 10/2014 | |
| CN | 104657857 | 5/2015 | |
| CN | 104680215 | 6/2015 | |
| JP | 2001282644 | 10/2001 | |
| JP | 2013539145 | 10/2013 | |
| KR | 20130108595 | 10/2013 | |
| WO | WO 2012047368 | 4/2012 | |
| WO | WO-2014176749 A1 * | 11/2014 | G06Q 20/12 |
| WO | WO 2017066699 | 4/2017 | |

OTHER PUBLICATIONS

Anonymous: "Class String", (Java Platform SE 8 ), Mar. 22, 2014, XP055730548, Retrieved from the Internet: URL: https://web.archive.org/web/20140322031304/http://docs.oracle.com/javase/8/docs/api/java/lang/String.htmI, retrieved on Sep. 14, 2020, 47 pages.
Crosby et al., "BlockChain Technology: Beyond Bitcoin," Sutardja Center for Entrepreneurship & Technology Technical Report, Oct. 16, 2015, 35 pages.
European Extended Search Report in European Patent Application. No. 16867922.3, dated Jun. 14, 2019, 6 pages.
International Preliminary Report on Patentability in International Application No. PCT/CN2016/106324 dated Feb. 21, 2017; 8 pages.
International Search Report issued by the International Searching Authority in International Application No. PCT/CN2016/106324 dated Feb. 7, 2017 with English Translation; 9 pages.
Nakamoto, "Bitcoin: A Peer-to-Peer Electronic Cash System," www.bitcoin.org, 2005, 9 pages.
Saettler, "Zapper boosts at the table mobile payments via QR codes", 2014, retrieved from https://web.archive.org/web/20140811181315/http://www.nnobileconnnnercedaily.conn/zapper-boosts-at-the-table-nnobile-payments-via-qr-codes, 2014, 10 pages.

* cited by examiner

INFORMATION GENERATION, ACQUISITION, AND PROCESSING TO IMPROVE SERVICE EFFICIENCY

CROSS-REFERENCE TO RELATED APPLICATIONS

This application is a continuation of and claims the benefit of priority of U.S. application Ser. No. 16/720,360, filed on Dec. 19, 2019, which is a continuation of U.S. application Ser. No. 15/986,939 filed on May 23, 2018, which is a continuation of PCT Application No. PCT/CN2016/106324, filed on Nov. 18, 2016, which claims priority to Chinese Patent Application No. 201510849154.2, filed on Nov. 27, 2015, and each application is hereby incorporated by reference in its entirety.

TECHNICAL FIELD

The present application relates to the field of computer technologies, and in particular, to an information generation method and apparatus, an information acquisition method and apparatus, an information processing method and apparatus, and a payment method and client.

BACKGROUND

In conventional technologies, target information (for example, image information or sound information) that includes user identity information can be generated. With rapid development of Internet technologies, higher service operation performing efficiency is needed. For example, when obtaining account information by recognizing target information, a user may want to make payment to two accounts by performing one recognition operation. However, in existing technologies, target information can include information related to one account. That is, the user may need to recognize two pieces of account information by performing two recognition operations, and separately perform two payment operations with the two accounts, which can affect efficiency of service performance.

Therefore, a generation method for target information that includes at least two pieces of user identity information and a recognition method for the target information are needed to improve service performance efficiency.

SUMMARY

Implementations of the present application provide an information generation method and apparatus, an information acquisition method and apparatus, an information processing method and apparatus, and a payment method and client, so as to improve efficiency of performing a service operation.

According to a first aspect, an information generation method is provided, and the generation method includes: receiving an information generation instruction entered by a first user, where the information generation instruction includes at least two pieces of user identity information; combining the at least two pieces of user identity information in a predetermined method, to obtain continuous text information, where the at least two pieces of user identity information in the continuous text information are separated by a separation string, and the separation string is a predefined character or character combination; and generating target information based on a predetermined algorithm and the continuous text information.

According to a second aspect, an information acquisition method is provided, and the acquisition method includes: recognizing pre-generated target information to obtain continuous text information, where the continuous text information includes at least two pieces of user identity information, the at least two pieces of user identity information are separated by a separation string, and the separation string is a predefined character or character combination; and parsing the continuous text information to obtain the at least two pieces of user identity information.

According to a third aspect, an information processing method is provided, and the processing method includes: recognizing pre-generated target information to obtain continuous text information; sending the continuous text information to a server, so that the server parses the continuous text information to obtain at least two pieces of user identity information; receiving the at least two pieces of user identity information sent by the server, and displaying the at least two pieces of user identity information; and performing a corresponding operation on the at least two pieces of user identity information based on information entered by a second user.

According to a fourth aspect, a payment method is provided, and the payment method includes: recognizing pre-generated target information to obtain continuous text information; sending the continuous text information to a payment server, so that the payment server parses the continuous text information to obtain at least two pieces of account information; receiving the at least two pieces of account information sent by the payment server, and displaying the at least two pieces of account information; determining a payment amount corresponding to each piece of account information based on information entered by a payor; and performing a payment operation based on the payment amount corresponding to each piece of account information.

According to a fifth aspect, an information generation apparatus is provided, and the generation apparatus includes a receiving unit, a combination unit, and a generation unit, where the receiving unit is configured to receive an information generation instruction entered by a first user, where the information generation instruction includes at least two pieces of user identity information; the combination unit is configured to combine, in a predetermined method, the at least two pieces of user identity information received by the receiving unit, to obtain continuous text information, where the at least two pieces of user identity information in the continuous text information are separated by a separation string, and the separation string is a predefined character or character combination; and the generation unit is configured to generate target information based on a predetermined algorithm and the continuous text information obtained by the combination unit.

According to a sixth aspect, an information acquisition apparatus is provided, and the acquisition apparatus includes a recognition unit and a parsing unit, where the recognition unit is configured to recognize pre-generated target information to obtain continuous text information, where the continuous text information includes at least two pieces of user identity information, the at least two pieces of user identity information are separated by a separation string, and the separation string is a predefined character or character combination; and the parsing unit is configured to parse the continuous text information obtained by the recognition unit to obtain the at least two pieces of user identity information.

According to a seventh aspect, an information processing apparatus is provided, and the processing apparatus includes a recognition unit, a sending unit, a receiving unit, and an execution unit, where the recognition unit is configured to recognize pre-generated target information to obtain continuous text information; the sending unit is configured to send the continuous text information obtained by the recognition unit to a server, so that the server parses the continuous text information to obtain at least two pieces of user identity information; the receiving unit is configured to: receive the at least two pieces of user identity information sent by the server, and display the at least two pieces of user identity information; and the execution unit is configured to perform a corresponding operation on the at least two pieces of user identity information based on information entered by a second user.

According to an eighth aspect, a payment client is provided, and the payment client includes a recognition unit, a sending unit, a determining unit, and an execution unit, where the recognition unit is configured to recognize pre-generated target information to obtain continuous text information; the sending unit is configured to send the continuous text information obtained by the recognition unit to a payment server, so that the payment server parses the continuous text information to obtain at least two pieces of account information; the determining unit is configured to determine a payment amount corresponding to each piece of account information based on information entered by a payor; and the execution unit is configured to perform a payment operation based on the payment amount that corresponds to each piece of account information and that is determined by the determining unit.

According to the information generation method and apparatus, the information acquisition method and apparatus, the information processing method and apparatus, and the payment method and client provided in the present application, the generation method includes: receiving the information generation instruction entered by the first user, where the information generation instruction includes at least two pieces of user identity information; combining the at least two pieces of user identity information in the predetermined method, to obtain the continuous text information, where the at least two pieces of user identity information in the continuous text information are separated by the separation string, and the separation string is a predefined character or character combination; and generating the target information based on the predetermined algorithm and the continuous text information. That is, in the present application, the target information includes at least two pieces of user identity information, so that when user identity information is obtained by recognizing the target information, the at least two pieces of user identity information are obtained by performing one recognition operation, and a service operation is performed (for example, simultaneously) on the at least two pieces of user identity information, thereby improving efficiency of performing the service operation on the at least two pieces of user identity information.

DESCRIPTION OF IMPLEMENTATIONS

Figure 1:
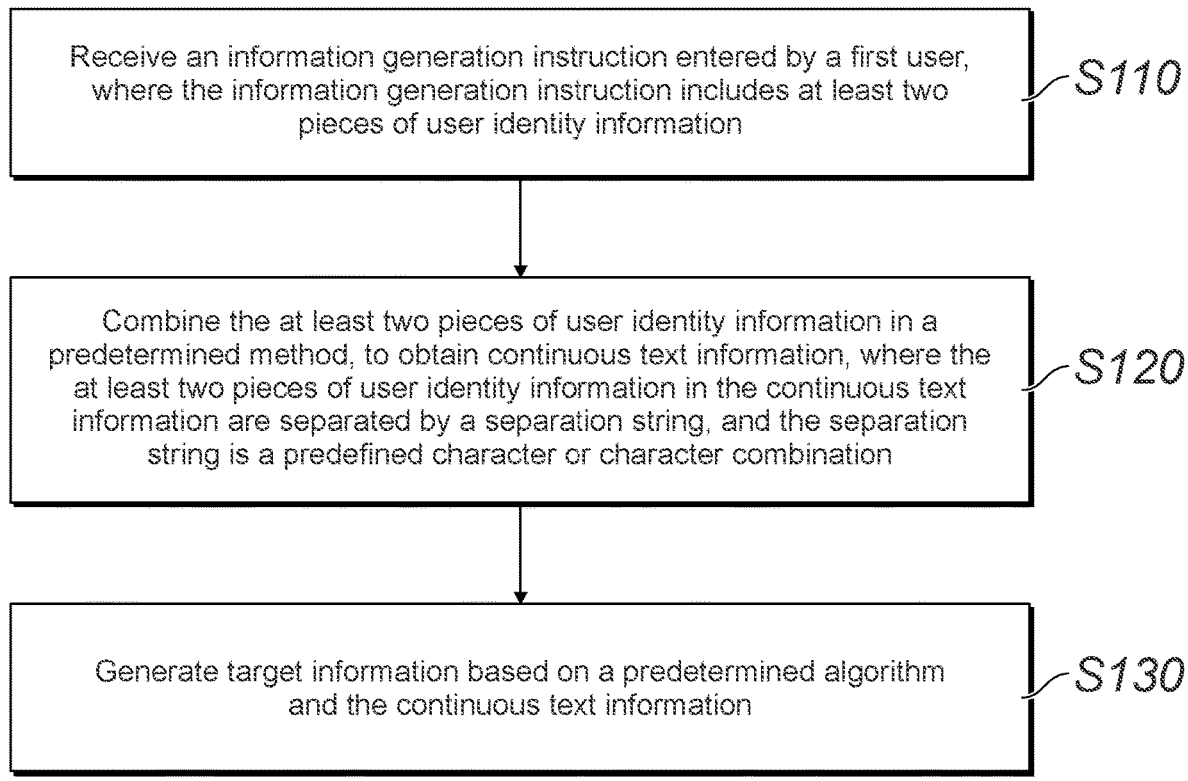
FIG. 1 is a flowchart illustrating an information generation method, according to an implementation of the present application.

To make the objectives, technical solutions, and advantages of the implementations of the present application clearer, the following describes technical solutions of implementations of the present application with reference to the accompanying drawings in the implementations of the present application. The described implementations are merely some, rather than all, of the possible implementations of the present application. Other implementations understood by a person of ordinary skill in the art, and based on the implementations of the present application, are considered to fall within the protection scope of the present application.

To facilitate understanding of the present application, the following uses detailed descriptions to provide further explanations with reference to the accompanying drawings, and the implementations constitute no limitation to the implementations of the present application.

An information generation method and apparatus, an information acquisition method and apparatus, an information processing method and apparatus, and a payment method and client provided in the present application are applicable to scenarios in which target information that includes at least two pieces of user identity information are generated in an Internet system. For example, the information generation method and apparatus, the information acquisition method and apparatus, the information processing method and apparatus, and the payment method and client can be applied to scenarios in which payment information that includes at least two pieces of user identity information is generated in a payment system. Here, the user identity information can include account information, account number information, bank card number information, or other information that can identify a user identity.

The payment system can include a payment client and a payment server. The payment client can include a display interface, an image recognition apparatus, and/or a sound recognition apparatus. The display interface can display payment processing results by a payment server of a payment request by a payment client server. The image recognition apparatus is used to recognize image information, for example, to recognize a QR code or an encrypted QR code, to obtain continuous text information (or character string information). The sound recognition apparatus is used to recognize sound information, for example, to recognize a sound wave or an encrypted sound wave, and obtain continuous text information (or character string information). Here, when the payment client is configured to recognize the encrypted QR code or the encrypted sound wave, the payment client can further include a corresponding decryption function, for example, it can include a function of decrypting text information encrypted by using an MD5 encryption algorithm. The payment server can be configured to: receive continuous text information sent by the payment client, and decrypt the continuous text information by using a predetermined algorithm, so as to obtain at least two pieces of user identity information. A payment amount corresponding to each piece of user identity information can be determined based on a payment amount and a payment proportion entered by a payor, or can be determined based on a payment amount or a predetermined proportion in a payment order. In addition, the payment information can be image information, for example, a QR code, or can be sound information, for example, a sound wave.

FIG. 1 is a flowchart illustrating an information generation method, according to an implementation of the present application. The generation method can be performed by a device that has processing capabilities such as a server, a system, or an apparatus. As shown in FIG. 1, the generation method can include the following steps.

Step 110: Receive an information generation instruction entered by a first user, where the information generation instruction includes at least two pieces of user identity information.

Here, in payment transactions, the first user can be a payee or a merchant, and the user identity information can include account information, account number information, bank card number information, or other information that can identify a user identity. For example, the user identity information is the account information, and the generated target information is a QR code. The information generation instruction can be triggered by clicking an option "My QR Code" in "Account Details" of a payment system by the payee. Because a QR code that includes one piece of account information can be generated with existing payment systems, it may be that account information of the payee cannot be edited. When a solution of the present application is implemented, account information in "Account Details" can be set to an editable state. Therefore, the payee can also add other account information. Alternatively, an option "Generate a QR code" can be added to the payment system. The payee can add at least two pieces of account information on a page corresponding to the option. After the account information is edited on the page, the information generation instruction is triggered when an "OK" button is clicked.

When the user identity information is a bank card number or other information that can identify a user's identity, or when the generated target information includes image or sound information other than the QR code, the information generation instruction can be triggered in a similar method. Details are omitted here to avoid duplication.

Step 120: Combine the at least two pieces of user identity information in a predetermined method, to obtain continuous text information, where the at least two pieces of user identity information in the continuous text information are separated by a separation string, and the separation string is a predefined character or character combination.

In some implementations, the separation string can include the following special characters or a combination of the following special characters: "#", "*", "< >", or "(.*)". Special characters can be any character that cannot be used to form the user identity information.

Combining the at least two pieces of user identity information in a predetermined method to obtain continuous text information can include:

Step A: Sort the at least two pieces of user identity information based on a predetermined sorting rule.

When there is primary user identity information and secondary user identity information in the at least two pieces of user identity information, the predetermined sorting rule can sort the primary user identity information before the secondary user identity information. For example, when the received information generation instruction includes two pieces of account information, and the two pieces of account information are merchant account information and waiter account information, the predetermined sorting rule can sort the merchant account information before the waiter account information.

Step B: Combine the sorted at least two pieces of user identity information with the predetermined method to obtain the continuous text information.

For example, step B can combine the sorted at least two pieces of user identity information by using the separation string to obtain the continuous text information.

As described in the previous example, assume that the merchant account information is "a@163.com", account information of a first waiter is "waiter1@163.com", and the separation string is "#", continuous text information obtained by combining two sorted pieces of account information by using the separation string is "a@163 com#waiter1@163.com".

Assuming, similar to the previous example, that account information includes a second waiter, "waiter2@163.com", and that there is no sequential relationship between the account information of the second waiter and the first waiter, continuous text information can be obtained by combining three sorted pieces of account information by using the separation string a@163.com#waiter1@163.com#waiter2@163.com or a@163.com#waiter2@163.com#waiter1@163.com.

In certain applications, priorities can be separately determined for a plurality of waiters. As described in the previous example, when the priority of the first waiter is higher than the priority of the second waiter, the obtained continuous text information can be "a@163.com#waiter1@163.com#waiter2@163.com".

The at least two pieces of user identity information can be sorted to facilitate user account recognition. For example, when the received continuous text information is "a@163.com#waiter1@163.com", "a@163.com" can be recognized as the merchant account information, and "waiter1@163.com" can be recognized as the waiter account information.

Step 130: Generate target information based on a predetermined algorithm and the continuous text information.

Here, the target information can be image information or sound information. For example, in the payment system, the target information can be a QR code or a sound wave.

When the obtained target information is the QR code, the predetermined algorithm can be any algorithm that can generate the QR code as described in the prior art. When the obtained target information is the sound wave, the predetermined algorithm can be any algorithm that can encode the continuous text information based on a predetermined coding rule and convert the encoded continuous text information into a signal on a corresponding sound frequency. For example, an algorithm that converts the continuous text information into octal data, where 0 to 7 in the octal data can be represented by using eight different sound frequencies, and converts the obtained octal data into signals on corresponding sound frequencies.

In payment transactions, step 110 to step 130 can be performed by the payment system.

According to the previously described implementation of the information generation method, the target information can include at least two pieces of user identity information. This can improve efficiency in obtaining at least two pieces of user identity information when user identity information is obtained by recognizing the target information, and thereby improving efficiency of performing a service operation on the at least two pieces of user identity information.

Figure 2:
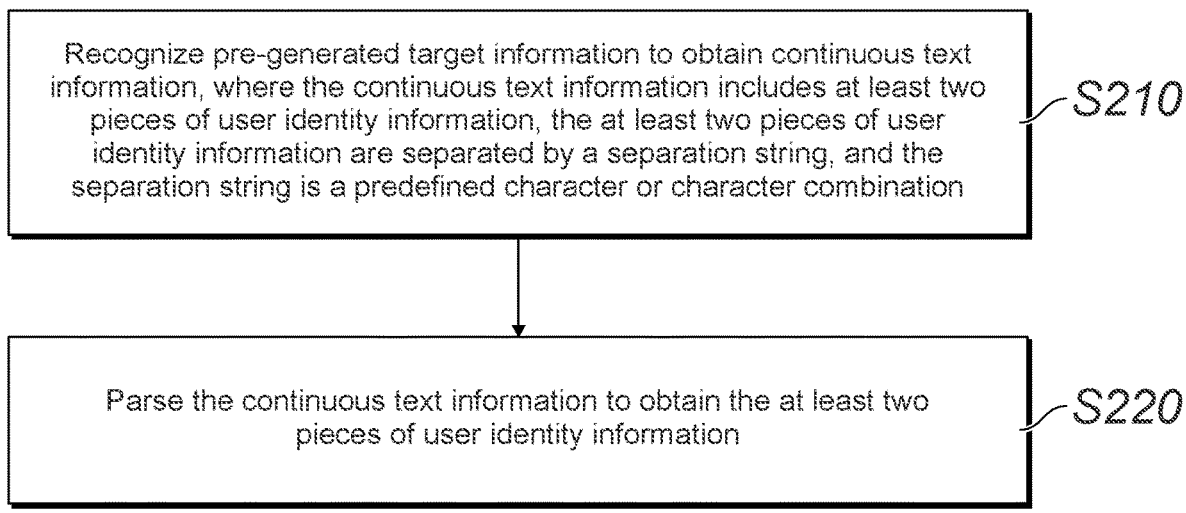
FIG. 2 is a flowchart illustrating an information acquisition method, according to another implementation of the present application.

FIG. 2 is a flowchart illustrating an information acquisition method, according to another implementation of the present application. The acquisition method can be performed by a device that has a processing capability such as a server, a system, or an apparatus. As shown in FIG. 2, the acquisition method can include the following steps.

Step 210: Recognize pre-generated target information to obtain continuous text information, where the continuous text information includes at least two pieces of user identity information, the at least two pieces of user identity information are separated by a separation string, and the separation string is a predefined character or character combination.

Here, the pre-generated target information can be picture information, for example, a QR code, or can be sound information, for example, a sound wave.

In a payment system, step 210 can be performed by a payment client. For example, when the pre-generated target information is a QR code, the pre-generated QR code can be recognized by enabling a "Scan" function in the payment client. Indeed, in another application scenario, step 210 can alternatively be performed by another system or apparatus that has an image recognition function or a sound recognition function.

Preferably, the at least two pieces of user identity information in the continuous text information are sorted.

In some implementations, the separation string can include the following special characters or a combination of the following special characters: "#", "*", "< >", or "(.*)". Special characters can be any character that cannot be used to form the user identity information. In addition, when there is primary user identity information and secondary user identity information in the at least two pieces of user identity information, a sequence of the at least two pieces of user identity information can be determined as the primary user identity information before the secondary user identity information. For example, in payment transactions, when the user identity information is account information, and two pieces of account information are merchant account information and waiter account information, a sequence of the two pieces of account information can be determined as the merchant account information before the waiter account information.

For example, when the continuous text information includes two pieces of user identity information, the obtained continuous text information can be "a@163.com#waiter1@163.com". However, when the continuous text information includes at least two (for example, three) pieces of user identity information, the obtained continuous text information can be "a@163.com#waiter2@163.com#waiter1@163.com".

Step 220: Parse the continuous text information to obtain the at least two pieces of user identity information.

Parsing of the continuous text information to obtain the at least two pieces of user identity information in step 220 can include:

Step X: Remove the separation string from the continuous text information, where continuous text information obtained after removing the separation string includes at least two pieces of sub-text information.

As described in the previous example, when a special character "#" is removed from the continuous text information "a@163.com#waiter1@163.com", two pieces of sub-text information "a@163.com" and "waiter1@163.com" can be obtained. When a special character "#" is removed from the continuous text information "a@163.com#waiter2@163.com#waiter1@163.com", three pieces of sub-text information "a@163.com", "waiter1@163.com", and "waiter2@163.com" are obtained.

Step Y: Use the at least two pieces of sub-text information as the at least two pieces of user identity information.

As described in the previous example, "a@163.com" and "waiter1@163.com" can be used as two pieces of account information, or "a@163.com", "waiter1@163.com", and "waiter2@163.com" can be used as three pieces of account information.

Additionally, if the at least two pieces of user identity information are sorted, the at least two pieces of user identity information can be parsed based on a predetermined sorting rule. For example, the sorting rule of the at least two pieces of user identity information in the continuous text information with which separation string is not removed can be that the merchant account information is sorted before the waiter account information. Therefore, "a@163.com" and "waiter1@163.com" can be parsed and used as the merchant account information and account information of the first waiter. If there is no priority order, "a@163.com", "waiter1@163.com", and "waiter2@163.com" can be parsed and used as merchant account information, account information of a first waiter, and account information of a second waiter, or can be parsed and used as the merchant account information, account information of a second waiter, and account information of a first waiter. However, if there is a priority order, and assuming that priority of the first waiter is higher than priority of the second waiter, "a@163.com", "waiter1@163.com", and "waiter2@163.com" can be parsed and used as the merchant account information, the account information of the first waiter, and the account information of the second waiter.

According to the previously described implementation information of the acquisition method, at least two pieces of user identity information can be obtained by performing one recognition operation. This can improve efficiency of obtaining at least two pieces of user identity information when user identity information is obtained by recognizing the target information, thereby improving efficiency of performing a service operation on at least two pieces of user identity information.

Figure 3:
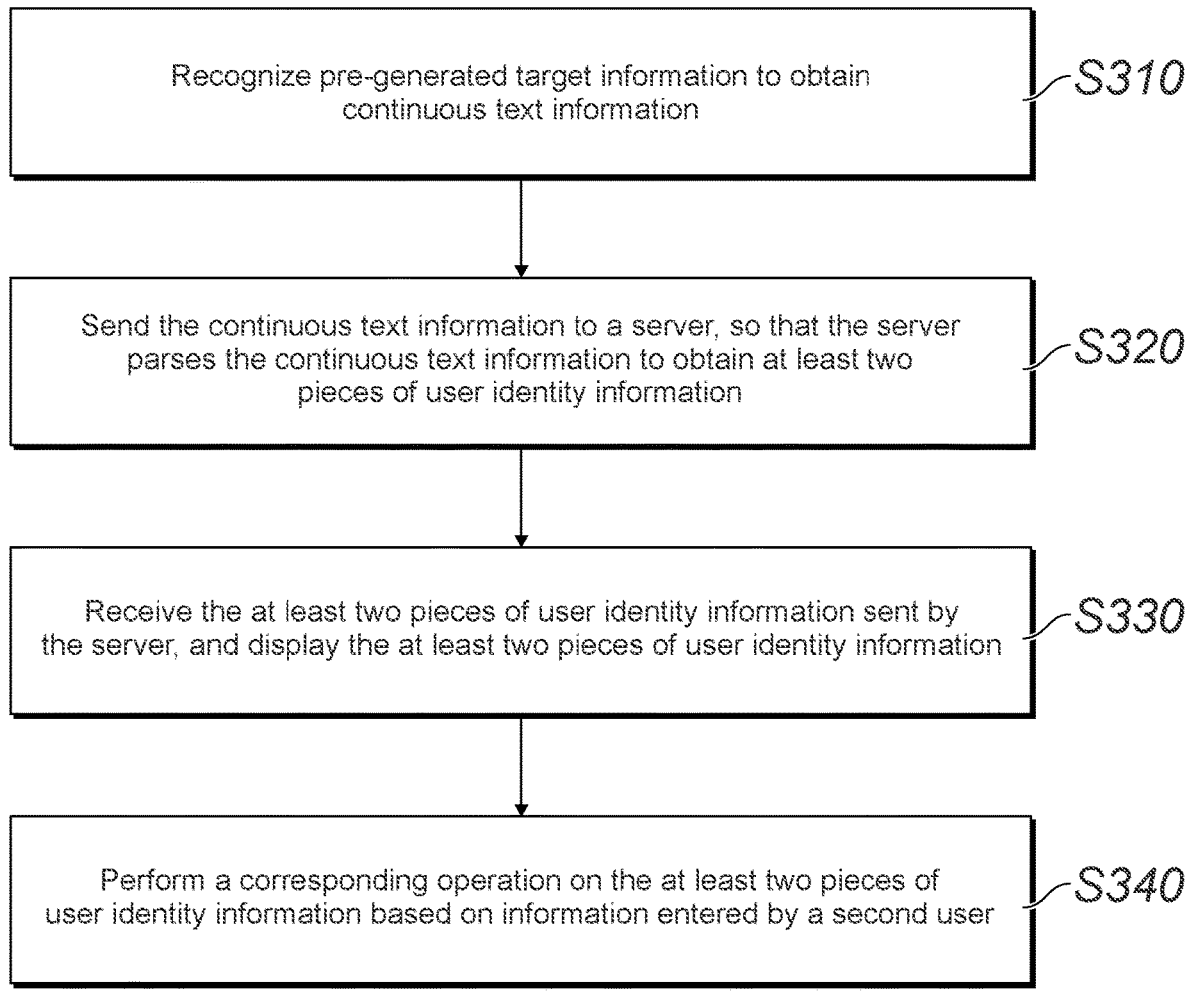
FIG. 3 is a flowchart illustrating an information processing method, according to still another implementation of the present application.

FIG. 3 is a flowchart illustrating an information processing method, according to still another implementation of the present application. The processing method can be performed by a device that has processing capabilities such as a server, a system, or an apparatus. As shown in FIG. 3, the payment method can include the following steps.

Step 310: Recognize pre-generated target information to obtain continuous text information.

In this implementation, for example, the pre-generated target information is a QR code. The QR code can be generated by a payment system of a payee or peer instant messaging software (for example, WeChat or QQ), so that a payor or a party adding a friend can scan the QR code.

For example, when the payor pays the payee, a QR code generated by the payee can be recognized by using a "Scan" function in a payment client, so as to obtain the continuous text information.

In another example, when a party adds another party to the friend list, a QR code generated by the another party can be recognized by using a "Scan" function in a client of an instant messaging software to obtain the continuous text information.

For example, when the continuous text information includes three pieces of account information combined by using a separation string "#", the continuous text information can be "a@163.com#waiter1@163.com#waiter2@163.com".

Step 320: Send the continuous text information to a server, so that the server can parse the continuous text information to obtain at least two pieces of user identity information.

As described in the previous first example, after obtaining the continuous text information, the payment client can send the continuous text information to a payment server. After receiving the continuous text information, the payment server can parse the continuous text information by using the parsing method in step 220, obtain the following three pieces of account information: "a@163.com", waiter1@163.com", and waiter2@163.com", and recognize, based on a predetermined sorting rule and priority, the three pieces of account information are merchant account information, account information of a first waiter, and account information of a second waiter.

As described in the previous example, after obtaining the continuous text information, the client of the instant messaging software can send the obtained continuous text information to a corresponding server; or after receiving the continuous text information, a server of the instant messaging software can parse the continuous text information by using the parsing method in step 220, and obtain the following three pieces of account number information: "XXX123", "12345678001", and "497770066".

Step 330: Receive the at least two pieces of user identity information sent by the server, and display the at least two pieces of user identity information.

As described in the previous example, after receiving the three pieces of account information, the payment client can display the merchant account information and related information of the two waiters, for example, an avatar, and can uniquely determine a target waiter and account information of the target waiter based on a selection instruction. Here, the payment server can pre-store a mapping relationship between a target waiter and account information of a target waiter in a storage unit.

As described in the previous example, after receiving the three pieces of account number information, the client of the instant messaging software can display the three pieces of account number information, and can further display related information of the three pieces of account number information (for example, an avatar and a located region).

Step 340: Perform a corresponding operation on the at least two pieces of user identity information based on information entered by a second user.

As described in the previous example, the second user can be the payor. The payment client receives a first payment amount corresponding to the merchant account information and a proportion of a second payment amount corresponding to waiter account information to the first payment amount entered by the payor; or a payment amount corresponding to each piece of account information. After receiving information entered by the payor, the payment client sends the information to the payment server. The payment server determines the payment amount corresponding to each piece of account information based on the received information. After determining the payment amount corresponding to each piece of account information, the payment server performs a payment operation based on the determined payment amount corresponding to each piece of account information or a final payment amount corresponding to each piece of account information. Therefore, when account information is obtained by recognizing the target information, at least two pieces of account information are obtained by performing one recognition operation, and the payment operation is performed (for example, simultaneously) on the at least two pieces of account information, thereby improving efficiency of performing the payment operation on the at least two pieces of account information.

As described in the previous example, the second user can be the party adding a friend. The information entered by the second user can be an instruction for adding specific account number information to a friend list, or can be an instruction for giving up adding specific account number information to a friend list.

Figure 4:
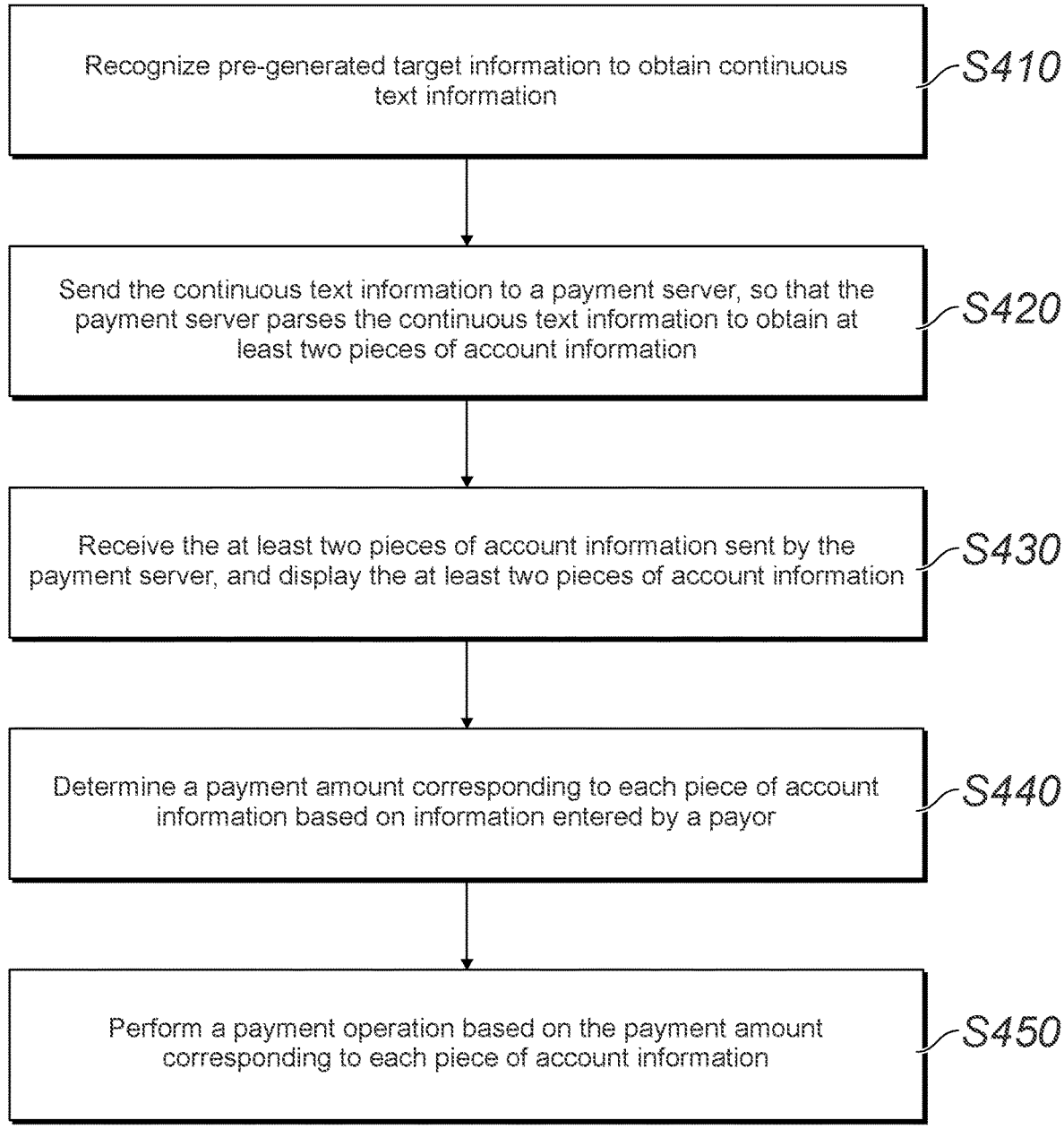
FIG. 4 is a flowchart illustrating a payment method, according to yet another implementation of the present application.

FIG. 4 is a flowchart illustrating a payment method, according to yet another implementation of the present application. The payment method can be performed by a device that has processing capabilities, such as a server, a system, or an apparatus, for example, a payment client. As shown in FIG. 4, the payment method can include the following steps.

Step 410: Recognize pre-generated target information to obtain continuous text information.

In this implementation, for example, the pre-generated target information is a QR code. The QR code can be generated by a payee by using a payment system. To help a payor to scan the QR code, the payee can print the QR code and attach to a place such as a wall of a shop or a counter near a cashier.

When the payor pays the payee, the payor can recognize, by using a "Scan" function in the payment client, the QR code printed on the wall of the shop or at the place near the cashier, to obtain the continuous text information.

For example, when the continuous text information includes three pieces of account information combined by using a separation string "#", the continuous text information can be "a@163.com#waiter1@163.com#waiter2@163.com".

Step 420: Send the continuous text information to a payment server, so that the payment server parses the continuous text information to obtain at least two pieces of account information.

After obtaining the continuous text information, the payment client can send the continuous text information to the payment server. After receiving the continuous text information, the payment server can parse the continuous text information by using the parsing method in step 220, obtain the following three pieces of account information: "a@163.com", "waiter1@163.com", and "waiter2@163.com", and recognize, based on a predetermined sorting rule and priority, the three pieces of account information are merchant account information, account information of a first waiter, and account information of a second waiter.

Step 430: Receive the at least two pieces of account information sent by the payment server, and display the at least two pieces of account information.

Figure 5:
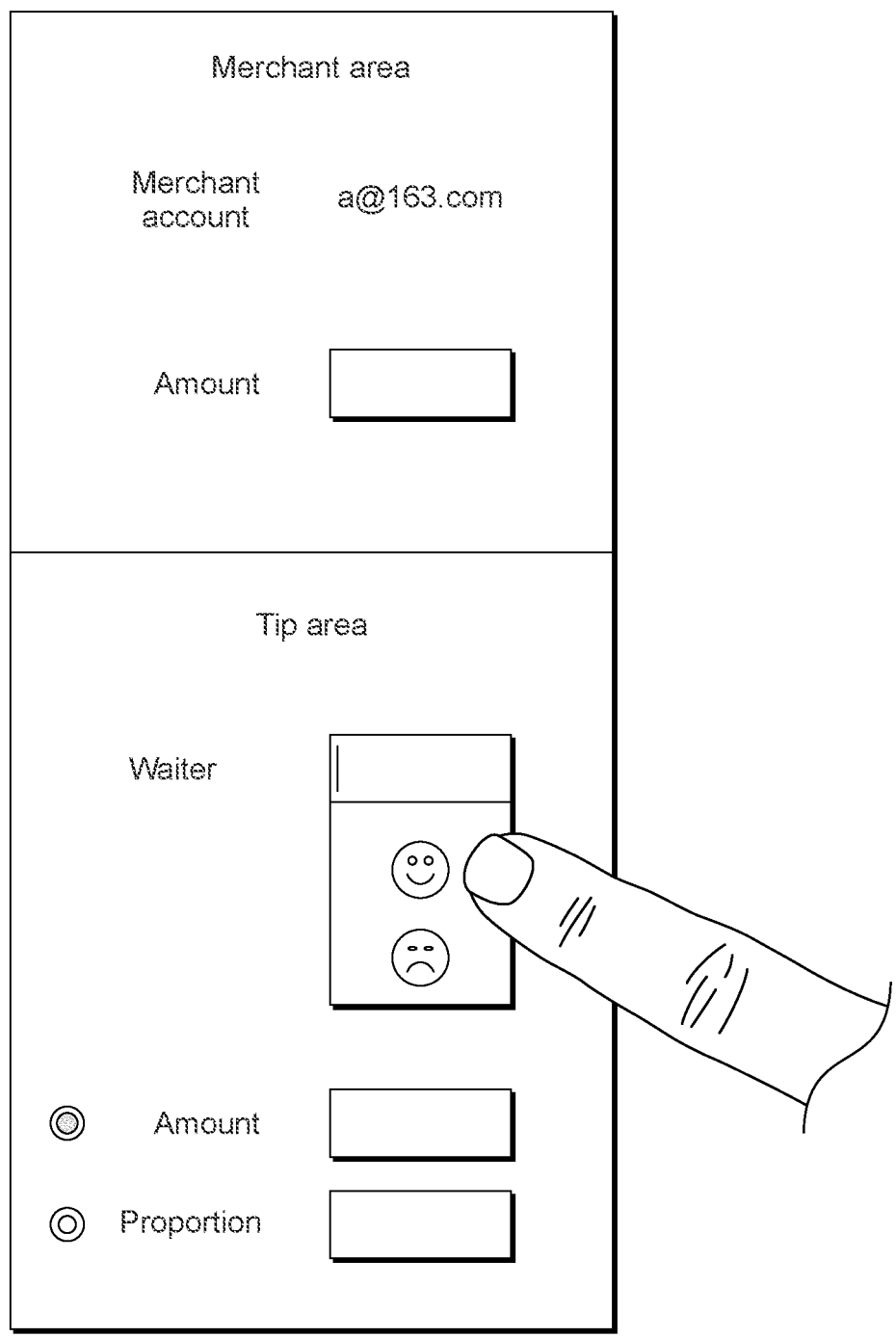
FIG. 5 is a schematic diagram illustrating a page format of a payment client, according to the present application.

As described in the previous example, after receiving the three pieces of account information, the payment client can display a page as shown in FIG. 5. The page can be displayed by using a display interface, and can include two areas, a merchant area and a tip area. The merchant area displays the merchant account information, and the tip area displays related information of the two waiters by using a drop-down box, for example, an avatar. The payment client can receive a selection instruction from the drop-down box, and send the received selection instruction to the payment server. The payment server can uniquely determine a target waiter and account information of the target waiter. In addition, the payment server can pre-store a mapping relationship between a target waiter and account information of a target waiter in a storage unit.

Step 440: Determine a payment amount corresponding to each piece of account information based on information entered by a payor.

The information entered by the payor includes: a first payment amount corresponding to a piece of account information and a proportion of a second payment amount corresponding to account information other than the first payment amount; or the payment amount corresponding to each piece of account information.

In FIG. 5, the payment client can receive a payment amount corresponding to the merchant account information through a text box in the merchant area, and can determine, by using, for example, a radio button in the tip area, whether a payment proportion or a payment amount is entered by the payor. When an instruction for entering the payment amount is received and sent to the payment server, the payment server can directly determine the payment amount corresponding to each piece of account information based on a payment amount received from, for example, a text box corresponding to the payment amount. When an instruction for entering the payment proportion is received and sent to the payment server, the payment server can determine the payment amount corresponding to each piece of account information based on a proportion received, for example, from a text box corresponding to the payment proportion and the payment amount in the merchant area.

In certain applications, the tip area in FIG. 5 may not include the radio button, and a proportional value can be predetermined by the payment server. When receiving the payment amount that corresponds to the merchant account information sent by the payment client, the payment server can determine the payment amount corresponding to each piece of account information based on the payment amount corresponding to the merchant account information and the predetermined proportion value. Alternatively, when directly receiving the payment amount that corresponds to each piece of account information entered by the payor, the payment server can preset a share percentage. That is, a share is determined based on a payment amount corresponding to the waiter's account and the share percentage. Afterwards, the share can be added to the payment amount corresponding to the merchant's account to obtain a final payment amount corresponding to the merchant's account. The share can be deducted from the payment amount corresponding to the waiter's account to obtain a final payment amount corresponding to the waiter's account.

Additionally, when a tip is paid to a plurality of waiters, in an example, one or more drop-down boxes can be added to a shopping area, as in FIG. 4. Other waiters and account information associated with the other waiters can be determined based on a selection instruction received from the one or more added drop-down boxes.

Step 450: Perform a payment operation based on the payment amount corresponding to each piece of account information.

After determining the payment amount corresponding to each piece of account information, the payment server performs a payment operation based on the determined payment amount corresponding to each piece of account information or a final payment amount corresponding to each piece of account information. Therefore, when account information is obtained by recognizing the target information, at least two pieces of account information are obtained by performing one recognition operation, and the payment operation is performed (for example, simultaneously) on the at least two pieces of account information, thereby improving efficiency of performing the payment operation on the at least two pieces of account information.

Figure 6:
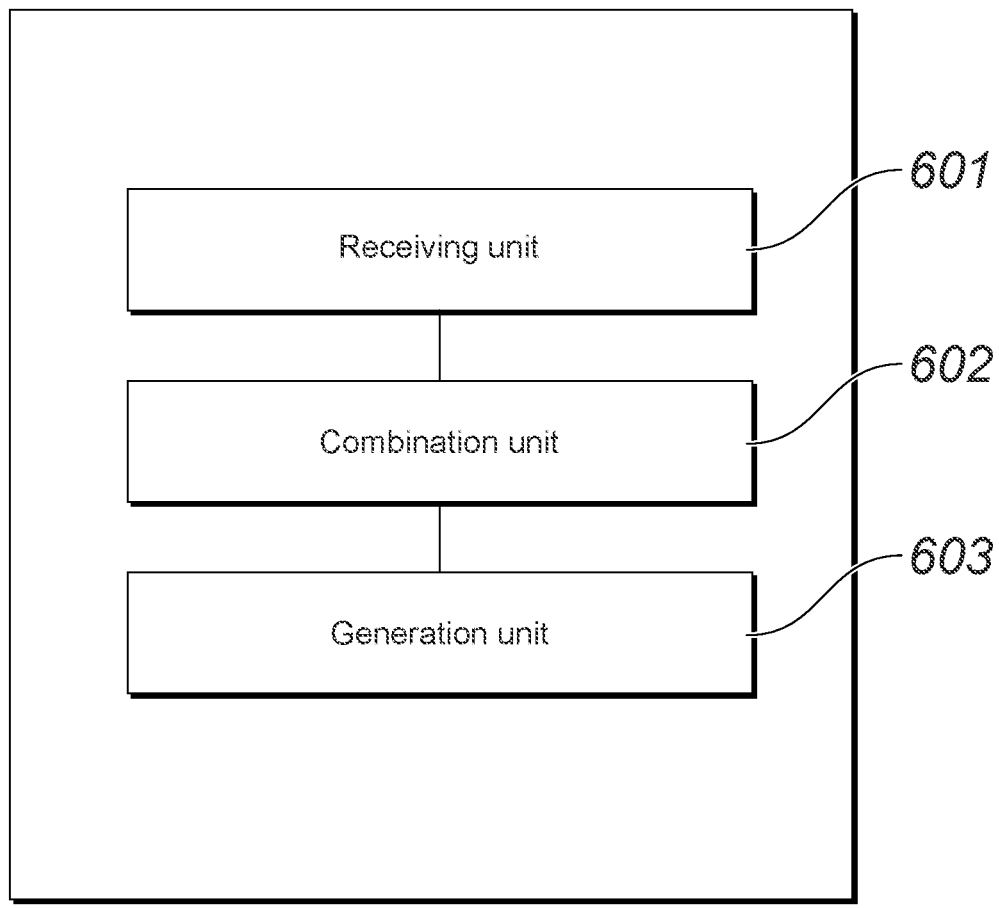
FIG. 6 is a schematic diagram illustrating an information generation apparatus, according to an implementation of the present application.

Corresponding to the information generation method, an implementation of the present application further provides an information generation apparatus. As shown in FIG. 6, the generation apparatus includes a receiving unit 601, a combination unit 602, and a generation unit 603.

The receiving unit 601 is configured to receive an information generation instruction entered by a first user, where the information generation instruction includes at least two pieces of user identity information.

The combination unit 602 is configured to combine, in a predetermined method, the at least two pieces of user identity information received by the receiving unit 601, to obtain continuous text information, where the at least two pieces of user identity information in the continuous text information are separated by a separation string, and the separation string is a predefined character or character combination.

The combination unit 602 is configured to: sort the at least two pieces of user identity information based on a predetermined sorting rule; and combine the sorted at least two pieces of user identity information in the predetermined method, to obtain the continuous text information.

The generation unit 603 is configured to generate target information based on a predetermined algorithm and the continuous text information obtained by the combination unit 602.

The target information includes image information or sound information.

Functions of each functional module of the apparatus in this implementation of the present application can be implemented by using steps in the previous method implementations. Therefore, specific working process of the apparatus provided in the present application is omitted here to avoid duplication.

According to the information generation apparatus provided in this implementation of the present application, the receiving unit 601 receives the information generation instruction entered by the first user, where the information generation instruction includes at least two pieces of user identity information; the combination unit 602 combines the at least two pieces of user identity information in the predetermined method, to obtain the continuous text information, where the at least two pieces of user identity information in the continuous text information are separated by the separation string, and the separation string is a predefined character or character combination; and the generation unit 603 generates the target information based on the predetermined algorithm and the continuous text information. Therefore, the target information can include at least two pieces of user identity information. This can improve efficiency of obtaining at least two pieces of user identity information when user identity information is obtained by recognizing the target information, thereby improving efficiency of performing a service operation on at least two pieces of user identity information.

Figure 7:
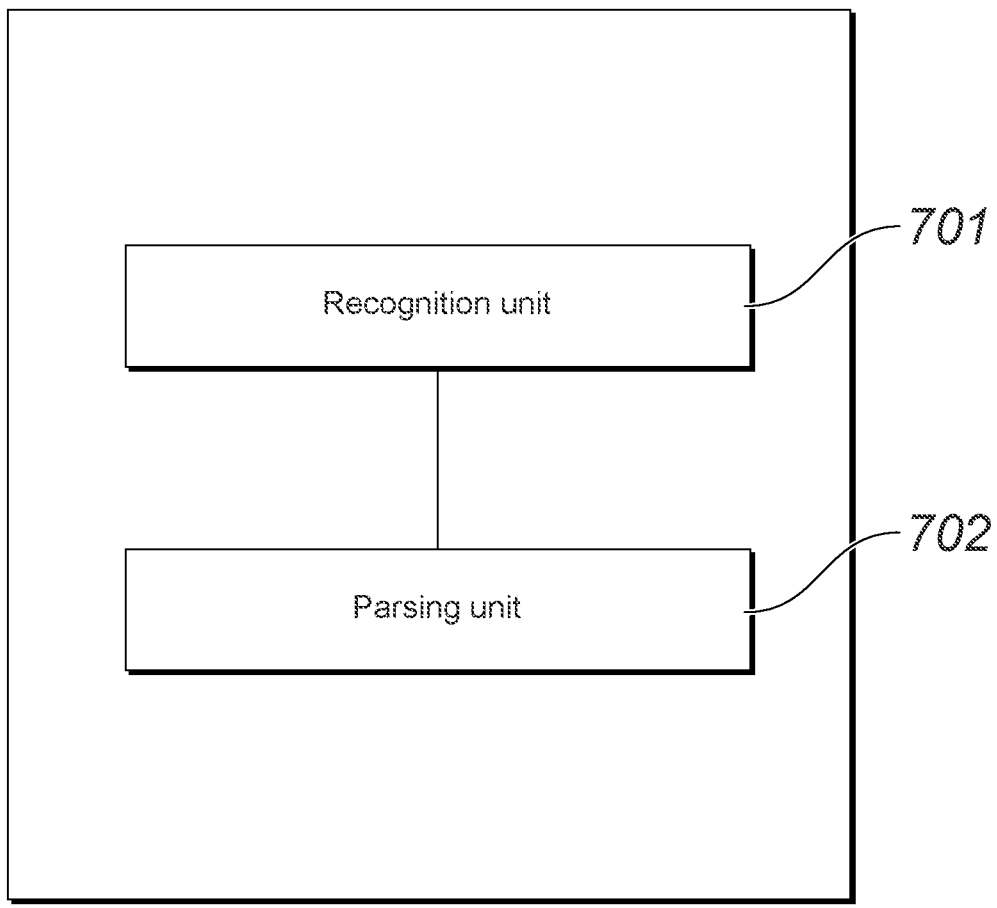
FIG. 7 is a schematic diagram illustrating an information acquisition apparatus, according to another implementation of the present application.

Corresponding to the information acquisition method, an implementation of the present application further provides an information acquisition apparatus. As shown in FIG. 7, the acquisition apparatus includes a recognition unit 701 and a parsing unit 702.

The recognition unit 701 is configured to recognize pre-generated target information to obtain continuous text information, where the continuous text information includes at least two pieces of user identity information, the at least two pieces of user identity information are separated by a separation string, and the separation string is a predefined character or character combination.

The parsing unit 702 is configured to parse the continuous text information obtained by the recognition unit 701, to obtain the at least two pieces of user identity information.

The parsing unit 702 is configured to: remove the separation string from the continuous text information, where continuous text information obtained after the separation string is removed includes at least two pieces of sub-text information; and use the at least two pieces of sub-text information as the at least two pieces of user identity information.

Functions of each functional module of the apparatus in this implementation of the present application can be implemented by using steps in the previously described method implementations. Therefore, specific working process of the apparatus provided in the present application is omitted here to avoid duplication.

According to the information acquisition apparatus provided in this implementation of the present application, the recognition unit 701 recognizes the pre-generated target information to obtain the continuous text information, where the continuous text information includes at least two pieces of user identity information, the at least two pieces of user identity information are separated by the separation string, and the separation string is a predefined character or character combination; and the parsing unit 702 parses the continuous text information to obtain the at least two pieces of user identity information. Therefore, at least two pieces of user identity information can be obtained by performing one recognition operation. This can improve efficiency of obtaining at least two pieces of user identity information when user identity information is obtained by recognizing the target information, thereby improving efficiency of performing a service operation on at least two pieces of user identity information.

Figure 8:
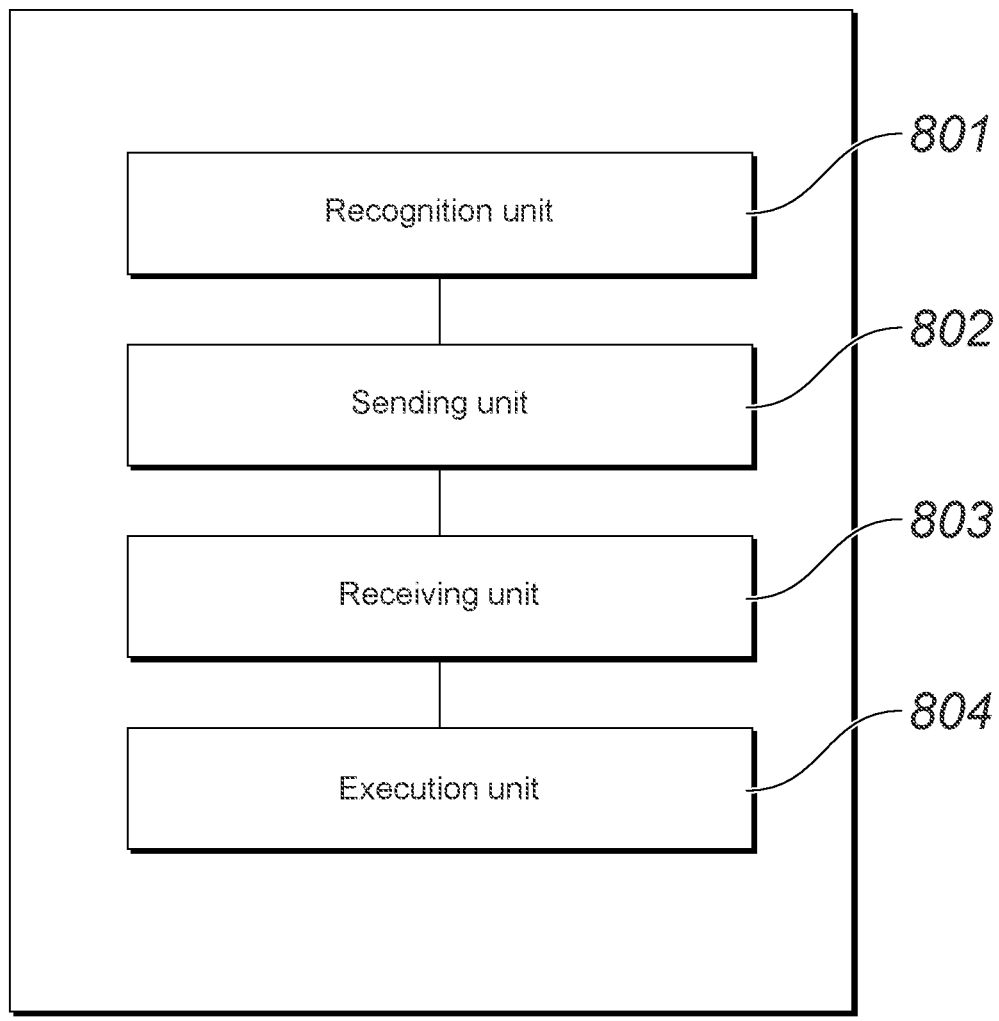
FIG. 8 is a schematic diagram illustrating an information processing apparatus, according to still another implementation of the present application.

Corresponding to the information processing method, an implementation of the present application further provides an information processing apparatus. As shown in FIG. 8, the processing apparatus includes a recognition unit 801, a sending unit 802, a receiving unit 803, and an execution unit 804.

The recognition unit 801 is configured to recognize pre-generated target information to obtain continuous text information.

The sending unit 802 is configured to send the continuous text information obtained by the recognition unit 801 to a server, so that the server parses the continuous text information to obtain at least two pieces of user identity information.

The receiving unit 803 is configured to: receive the at least two pieces of user identity information sent by the server, and display the at least two pieces of user identity information.

The execution unit 804 is configured to perform a corresponding operation on the at least two pieces of user identity information based on information entered by a second user.

Functions of each functional module of the apparatus in this implementation of the present application can be implemented by using steps in the previous method implementations. Therefore, specific working process of the apparatus provided in the present application is not described here.

According to the information processing apparatus provided in this implementation of the present application, the recognition unit 801 recognizes the pre-generated target information to obtain the continuous text information; the sending unit 802 sends the continuous text information to the server, so that the server parses the continuous text information to obtain the at least two pieces of user identity information; the receiving unit 803 receives the at least two pieces of user identity information sent by the server, and displays the at least two pieces of user identity information; and the execution unit 804 is configured to perform the corresponding operation on the at least two pieces of user identity information based on the information entered by the second user. Therefore, when user identity information is obtained by recognizing the target information, at least two pieces of user identity information are obtained by performing one recognition operation, and a corresponding operation is performed on the at least two pieces of user identity information, thereby improving efficiency of performing a service operation on at least two pieces of user identity information.

Figure 9:
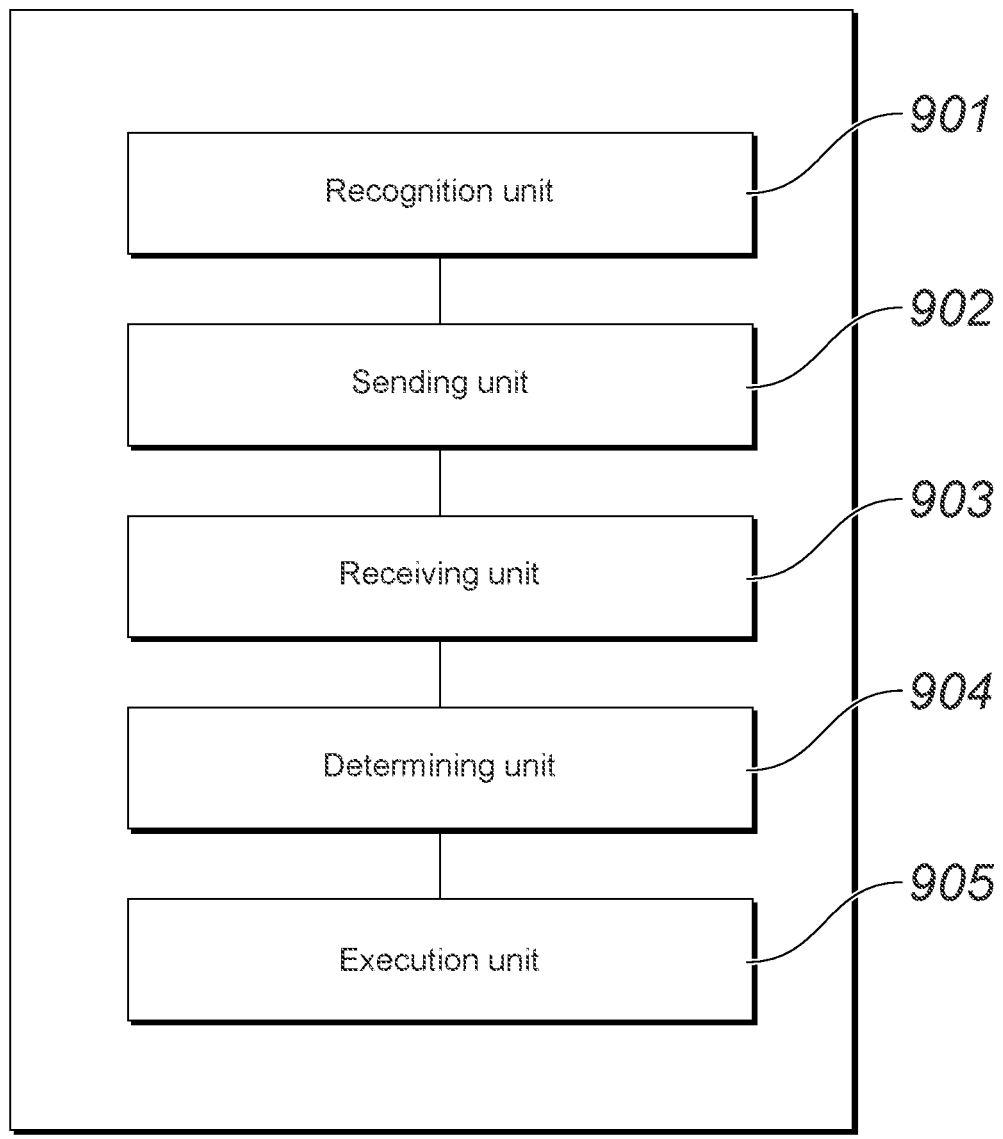
FIG. 9 is a schematic diagram illustrating a payment client, according to yet another implementation of the present application.

Corresponding to the payment method, an implementation of the present application further provides a payment client. As shown in FIG. 9, the payment client includes a recognition unit 901, a sending unit 902, a receiving unit 903, a determining unit 904, and an execution unit 905.

The recognition unit 901 is configured to recognize pre-generated target information to obtain continuous text information.

The sending unit 902 is configured to send the continuous text information obtained by the recognition unit 901 to a payment server, so that the payment server parses the continuous text information to obtain at least two pieces of account information.

The receiving unit 903 is configured to: receive the at least two pieces of account information sent by the payment server, and display the at least two pieces of account information.

The determining unit 904 is configured to determine a payment amount corresponding to each piece of account information based on information entered by a payor.

The information entered by the payor includes: a first payment amount corresponding to a piece of account information and a proportion of a second payment amount corresponding to other account information to the first payment amount; or the payment amount corresponding to each piece of account information.

The execution unit 905 is configured to perform a payment operation based on the payment amount that corresponds to each piece of account information and that is determined by the determining unit 904.

Functions of each functional module of the apparatus in this implementation of the present application can be implemented by using steps in the previous method implementations. Therefore, specific working process of the apparatus provided in the present application is not described here.

According to the payment client provided in this implementation of the present application, the recognition unit 901 recognizes the pre-generated target information to obtain the continuous text information; the sending unit 902 sends the continuous text information to the payment server, so that the payment server parses the continuous text information to obtain the at least two pieces of account information; the receiving unit 903 receives the at least two pieces of account information sent by the payment server, and displays the at least two pieces of account information; the determining unit 904 determines the payment amount corresponding to each piece of account information based on the information entered by the payor; and the execution unit 905 performs the payment operation based on the payment amount corresponding to each piece of account information. Therefore, when account information is obtained by recognizing the target information, at least two pieces of account information are obtained by performing one recognition operation, and the payment operation is performed (for example, simultaneously) on the at least two pieces of account information, thereby improving efficiency of performing the payment operation on the at least two pieces of account information.

A person skilled in the art can be further aware that, in combination with the examples described in the implementations disclosed in the present specification, objects and algorithm steps can be implemented by electronic hardware, computer software, or a combination of the electronic hardware and the computer software. To describe the interchangeability between the hardware and the software, the previous has generally described structure and steps of each example based on functions. Whether the functions are performed by hardware or software depends on particular applications and design constraint conditions of the technical solutions. A person skilled in the art can use different methods to implement the described functions for each particular application, but it should not be considered that the implementation goes beyond the scope of the present application.

Steps of methods or algorithms described in the implementations disclosed in this specification can be implemented by hardware, a software module executed by a processor, or a combination of the hardware and the software module. The software module can reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the previous detailed descriptions, the objective, technical solutions, and benefits of the present application are further described in detail. It should be understood that the previous descriptions are merely implementations of the present application, but are not intended to limit the protection scope of the present application. Any modification, equivalent replacement, or improvement made without departing from the spirit and principle of the present application should fall within the protection scope of the present application.

Figure 10:
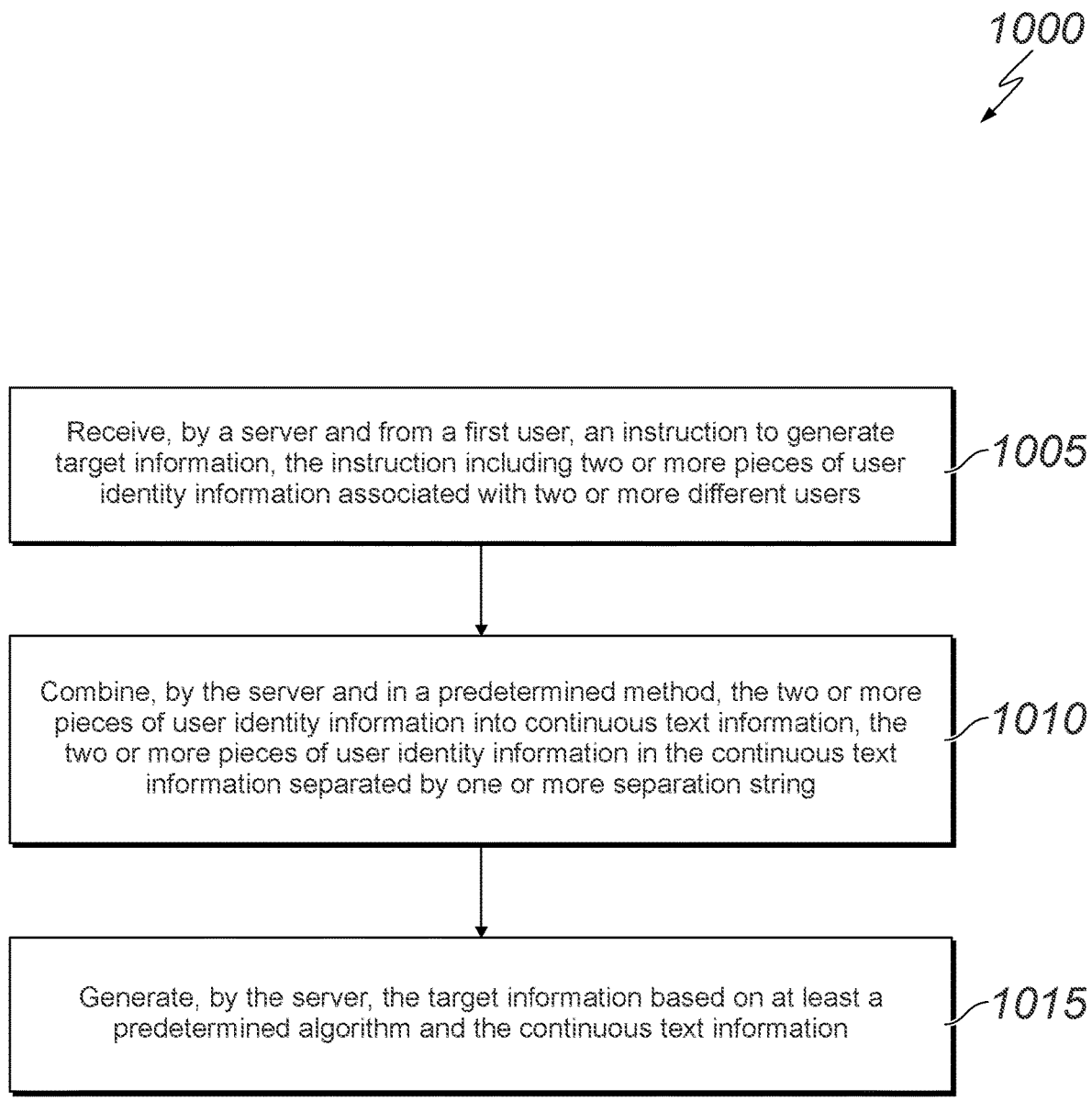
FIG. 10 is a flowchart illustrating an example of a computer-implemented method for generating information including two or more pieces of user identity information associated with two or more different users, according to an implementation of the present disclosure.

FIG. 10 is a flowchart illustrating an example of a computer-implemented method 1000 for generating information including two or more pieces of user identity information associated with two or more different users, according to an implementation of the present disclosure. For clarity of presentation, the description that follows generally describes method 1000 in the context of the other figures in this description. However, it will be understood that method 1000 can be performed, for example, by any system, environment, software, and hardware, or a combination of systems, environments, software, and hardware, as appropriate. In some implementations, various steps of method 1000 can be run in parallel, in combination, in loops, or in any order.

At 1005, an instruction to generate target information is received by a server and from a first user. The instruction includes two or more pieces of user identity information associated with two or more different users. For example, each user identity information is for a different user. The target information can be used by the first user as information that provides two or more pieces of user identity information to others. The target information can include at least one of image information (such as a QR code) and sound information (such as a sound wave). In some implementations, the two or more pieces of user identity information includes user identity information associated with the first user and user identity information associated with one or more user different from the first user. Each user identity information can include account information, account number information, bank card number information, or other information that can identify a particular user.

In some implementations, the first user is a payee (such as a business/merchant) expecting a payment from a payor (such as a customer of the business). To facilitate a payment transaction, the first user can instruct the server (such as a payment server) to generate target information that the payor can use to perform the payment transaction. Additionally and in some implementations, the payor may be required to only perform a single recognition operation (such as, scanning the target information) in order to make payments to multiple accounts. For example, the first user can edit account information in "Account Details" of the first user's account to add other account information different from the first user's account information. In some cases, the system can provide an option (such as "Generate a QR code") for the first user to add multiple pieces of account information. After account information is edited, an instruction to generate target information is triggered when, for example, an "OK" button is clicked. From 1005, method 1000 proceeds to 1010.

At 1010, the two or more pieces of user identity information are combined, by the server and in a predetermined method, into continuous text information. The two or more pieces of user identity information in the continuous text information are separated by one or more separation string. For example, the server can automatically place a separation string between two pieces of user identity information that are next to each other in the continuous text information. In some implementations, each separation string is a predefined character or a predefined combination of characters that are not used to form the user identity information (such as, "#", "*", "< >", or "(.*)").

In some implementations, the predetermined method is based on at least priorities of the two or more pieces of user identity information. For example, the server can combine the two or more pieces of user identity information into the continuous text information in an order that is based on the priorities of the two or more pieces of user identity information. For example, if the two or more pieces of user identity information includes "a@163.com" (such as, merchant account information) and "waiter1@163.com" (such as, waiter account information), the server can sort the two or more pieces of user identity information first, and put "a@163.com" before "waiter1@163.com" if "a@163.com"

has a higher priority than "waiter1@163.com". Next, the server can "combine a@163.com" and "waiter1@163.com" into continuous text information (such as, "a@163.com#waiter1@163.com"). From 1010, method 1000 proceeds to 1015.

At 1015, the target information is generated, by the server, based on at least a predetermined algorithm and the continuous text information. In some implementations, if the requested target information is a QR code, the predetermined algorithm can be an algorithm that generates a QR code. If the requested target information is a sound wave, the predetermined algorithm can be an algorithm that encodes the continuous text information and converts the encoded continuous text information into signals on corresponding sound frequencies. For example, the predetermined algorithm can encode the continuous text information into octal data. Eight different sound frequencies represent 0 to 7 in the octal data. Then, the predetermined algorithm can convert the encoded octal data into signals on corresponding sound frequencies.

In some implementations, once the target information is generated, the target information is transmitted by the server and to the first user. The first user can use the target information as information that provides two or more pieces of user identity information to others. For example, the first user can provide the target information to a customer using a mobile device (such as, displaying a QR code for the customer to scan). The customer can use a client application installed on the mobile device to recognize the continuous text information from the target information. In addition, by automatically removing one or more separation string in the continuous text information, the client application can obtain two or more pieces of sub-text information, which the client application considers as the two or more pieces of user identity information. Therefore, by performing a single recognition operation, instead of multiple recognition operations, the client application can obtain two or more pieces of user identity information. For example, if the recognized continuous text information is "a@163.com#waiter1@163.com", by automatically removing the "#", two pieces of user identity information, "a@163.com" and "waiter1@163.com", are obtained.

In some implementations, once the client application recognizes the continuous text information from the target information, the client application can transmit the continuous text information to the server for phasing the continuous text information. For example, the server can automatically remove one or more separation string in the continuous text information to obtain two or more pieces of sub-text information. The two or more pieces of sub-text information can then be transmitted to the client application by the server. In response to receiving the two or more pieces of sub-text information, the client application can use the two or more pieces of sub-text information as the two or more pieces of user identity information.

In some implementations, after the client application obtains the two or more pieces of user identity information, the client application can display the two or more pieces of user identity information on the mobile device associated with the client application. A second user, such as a customer, can input information on the mobile device for the displayed two or more pieces of user identity information. In response to the second user input, the client application can perform corresponding operations on the two or more pieces of user identity information based on the second user input.

In some implementations, the server is a payment server, the client application is a payment client application associated with the payment server, the first user is a payee (such as a business/merchant), and the second user is a payor (such as a customer of the business). The business expects a payment from the customer through the payment system. The payment is to the business and one or more additional user (such as, an employee of the business). To facilitate the payment transaction, the payment server can automatically generate, for example, a QR code that includes account information of the business and account information of the one or more employee (such as waiter or waitress) in response to receiving an instruction from the business. The customer can scan the QR code provided by the business to obtain the account information of the business and the account information of the one or more employee. The multiple pieces of account information can be displayed automatically, for example, on a mobile device, so that the customer can make payments to corresponding accounts in a single operation. For example, a customer can make a direct payment to a restaurant and a direct payment to a waiter serving the customer by scanning a single QR code to obtain account information of both the restaurant and the waiter, instead of scanning two QR codes, one for obtaining account information of the restaurant and the other for obtaining account information of the waiter. In other words, the waiter receives a payment to the waiter's account directly from the customer, not indirectly through the restaurant. After 1015, method 1000 stops.

A user can use application software installed on a mobile device to recognize account information to, for example, make a mobile payment. Normally, a single recognition operation can recognize a single piece of account information associated with a single account. As a result, multiple recognition operations are required to recognize multiple pieces of account information associated with multiple different accounts and to make payments to the multiple different accounts. The subject matter described in this specification can be used to generate target information that include multiple pieces of user identity information (such as account information). For example, multiple pieces of user identity information can be combined into continuous text information to generate the target information. Two pieces of user identity information that are next to each other in the continuous text information are separated by a separation string. As a result, target information that includes multiple pieces of user identity information can be generated. In doing so, a user can use application software installed on a mobile device to obtain multiple pieces of user identity information by performing a single recognition operation on the target information, thereby improving operation efficiency on the multiple pieces of user identity information and user experience when using the application software, for example, to make payments to multiple different accounts associated with the multiple pieces of user identity information.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
scanning, by a first device operated by a first user using an instant messaging program installed on the first device, pre-generated target information to obtain continuous text information;
transmitting, by the first device, the continuous text information to a payment server;
receiving, by the first device, at least two pieces of user identity information, respectively, associated with two or more different users from the payment server, subsequent to the payment server decrypting the continuous text information to produce the at least two pieces of user identity information;
displaying, by the first device on a display interface of the first device, the at least two pieces of user identity information;
receiving, by the first device, at least two payment amounts through the display interface, wherein the at least two payment amounts respectively correspond to the at least two pieces of user identity information; and
transmitting, by the first device to the payment server, the at least two payment amounts to perform a payment operation that is from the first user to the two or more different users, wherein the at least two payment amounts are paid to the two or more different users, respectively.

2. The computer-implemented method of claim 1, wherein the pre-generated target information includes a QR code, and the QR code is generated by an instant messaging program installed on a second device.

3. The computer-implemented method of claim 1, wherein the user identity information includes at least one of account information, account number information, or bank card number information.

4. The computer-implemented method of claim 1, wherein one of the two or more different users is a payee or a business, and the first user of the first device is a payor or a customer of the business.

5. The computer-implemented method of claim 1, further comprising displaying, by the first device on the display interface of the first device, at least two avatars respectively corresponding to the at least two pieces of user identity information displayed on the display interface of the first device.

6. The computer-implemented method of claim 1, wherein the at least two pieces of user identity information are displayed based on a predetermined priority order, and at least two locations are displayed respectively corresponding to the at least two pieces of user identity information displayed on the display interface of the first device.

7. A non-transitory, computer-readable medium storing one or more instructions executable by a computer system to perform operations comprising:
scanning, by a first device operated by a first user using an instant messaging program installed on the first device, pre-generated target information to obtain continuous text information;
transmitting, by the first device, the continuous text information to a payment server;
receiving, by the first device, at least two pieces of user identity information, respectively, associated with two or more different users from the payment server, subsequent to the payment server decrypting the continuous text information to produce the at least two pieces of user identity information;
displaying, by the first device on a display interface of the first device, the at least two pieces of user identity information;
receiving, by the first device, at least two payment amounts through the display interface, wherein the at least two payment amounts respectively correspond to the at least two pieces of user identity information; and
transmitting, by the first device to the payment server, the at least two payment amounts to perform a payment operation that is from the first user to the two or more different users, wherein the at least two payment amounts are paid to the two or more different users, respectively.

8. The non-transitory, computer-readable medium of claim 7, wherein the pre-generated target information includes a QR code, and the QR code is generated by an instant messaging program installed on a second device operated by one of the two or more different users.

9. The non-transitory, computer-readable medium of claim 7, wherein the user identity information includes at least one of account information, account number information, or bank card number information.

10. The non-transitory, computer-readable medium of claim 7, wherein one of the two or more different users is a payee or a business, and the first user of the first device is a payor or a customer of the business.

11. The non-transitory, computer-readable medium of claim 7, wherein the operations further comprise displaying, by the first device on the display interface of the first device, at least two avatars respectively corresponding to the at least two pieces of user identity information displayed on the display interface of the first device.

12. The non-transitory, computer-readable medium of claim 7, wherein the at least two pieces of user identity information are displayed based on a predetermined priority order, and at least two locations are displayed respectively corresponding to the at least two pieces of user identity information displayed on the display interface of the first device.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
scanning, by a first device operated by a first user using an instant messaging program installed on the first device, pre-generated target information to obtain continuous text information;
transmitting, by the first device, the continuous text information to a payment server;
receiving, by the first device, at least two pieces of user identity information, respectively, associated with two or more different users from the payment server, subsequent to the payment server decrypting the continuous text information to produce the at least two pieces of user identity information;
displaying, by the first device on a display interface of the first device, the at least two pieces of user identity information;
receiving, by the first device, at least two payment amounts through the display interface, wherein the at least two payment amounts respectively correspond to the at least two pieces of user identity information; and transmitting, by the first device to the payment server, the at least two payment amounts to perform a payment operation that is from the first user to the two or more different users, wherein the at least two payment amounts are paid to the two or more different users, respectively.

14. The computer-implemented system of claim 13, wherein the pre-generated target information includes a QR code, and the QR code is generated by an instant messaging program installed on a second device operated by one of the two or more different users.

15. The computer-implemented system of claim 13, wherein the user identity information includes at least one of account information, account number information, or bank card number information.

16. The computer-implemented system of claim 13, wherein the operations further comprise displaying, by the first device on the display interface of the first device, at least two avatars respectively corresponding to the at least two pieces of user identity information displayed on the display interface of the first device.

17. The computer-implemented system of claim 13, wherein the at least two pieces of user identity information are displayed based on a predetermined priority order, and at least two locations are displayed respectively corresponding to the at least two pieces of user identity information displayed on the display interface of the first device.

* * * * *